(12) United States Patent
Miyazawa

(10) Patent No.: US 9,758,128 B2
(45) Date of Patent: Sep. 12, 2017

(54) KEYLESS ENTRY SYSTEM

(71) Applicant: Alps Electric Co., Ltd., Tokyo (JP)

(72) Inventor: Akira Miyazawa, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/136,357

(22) Filed: Apr. 22, 2016

(65) Prior Publication Data

US 2016/0236652 A1     Aug. 18, 2016

(30) Foreign Application Priority Data

Nov. 7, 2013   (JP) .................................. 2013-231057

(51) Int. Cl.
| | |
|---|---|
| B60R 25/24 | (2013.01) |
| B60R 25/40 | (2013.01) |
| G08C 17/02 | (2006.01) |
| G07C 9/00 | (2006.01) |

(52) U.S. Cl.
CPC .............. *B60R 25/24* (2013.01); *B60R 25/40* (2013.01); *G07C 9/00126* (2013.01); *G08C 17/02* (2013.01); *G07C 2009/00769* (2013.01); *G08C 2201/12* (2013.01)

(58) Field of Classification Search
CPC ..... B60R 25/24; B60R 25/40; G07C 9/00126; G08C 17/02
See application file for complete search history.

(56) References Cited

U.S. PATENT DOCUMENTS 6,259,168 B1   7/2001 Okada

FOREIGN PATENT DOCUMENTS

| JP | 2000-079868 | 3/2000 |
| JP | 2008-106577 | 5/2008 |
| JP | 2011-184959 | 9/2011 |
| JP | 2012-227586 | 11/2012 |

OTHER PUBLICATIONS

International Search Report corresponding to Application No. PCT/JP2014/079336 filed on Aug. 12, 2014, 6 pages.

*Primary Examiner* — Nabil Syed
(74) *Attorney, Agent, or Firm* — Brinks Gilson & Lione

(57) ABSTRACT

A keyless entry system includes a first communication apparatus and a second communication apparatus. The first communication apparatus includes first transmitter, first receiver, and first two-way communication device. The second communication apparatus includes second receiver, second transmitter, and second two-way communication device. The first communication apparatus or the second communication apparatus includes electric field strength detector. In a case where the first communication apparatus and the second communication apparatus are not connected to each other through two-way communication or electric field strength detected by the electric field strength detector is less than a predetermined value, the first communication apparatus stops a call function of the first transmitter or the second communication apparatus stops a wait function of the second receiver.

2 Claims, 8 Drawing Sheets

FIG. 2
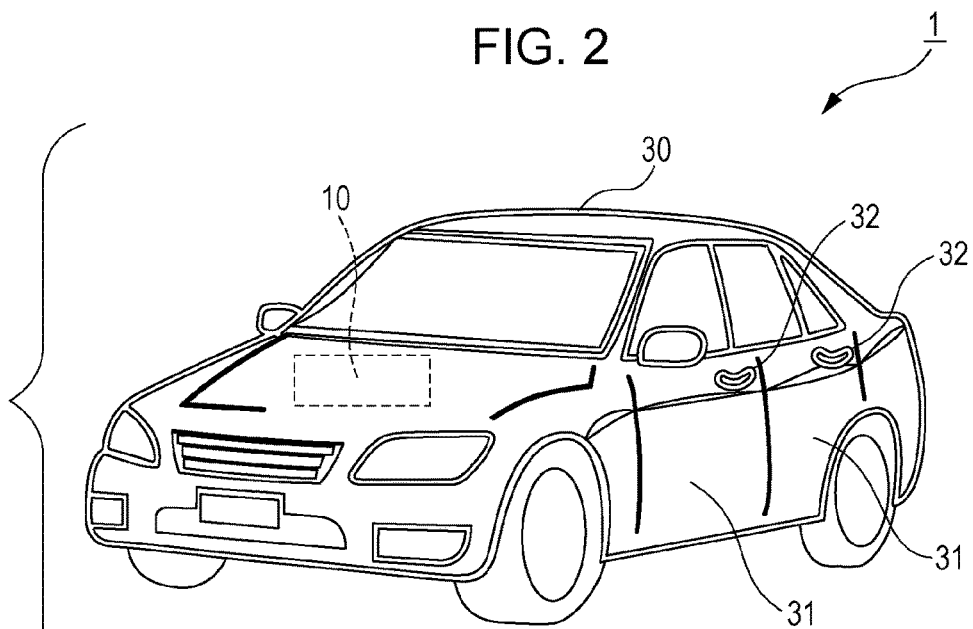
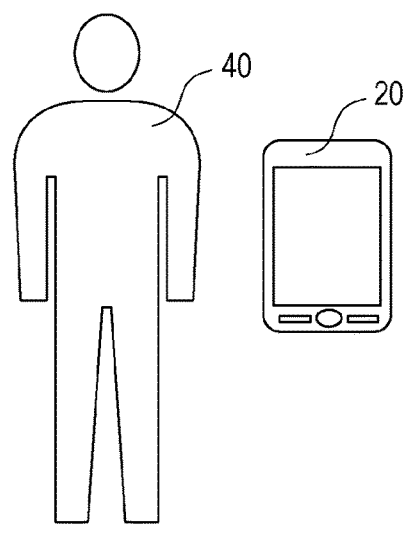

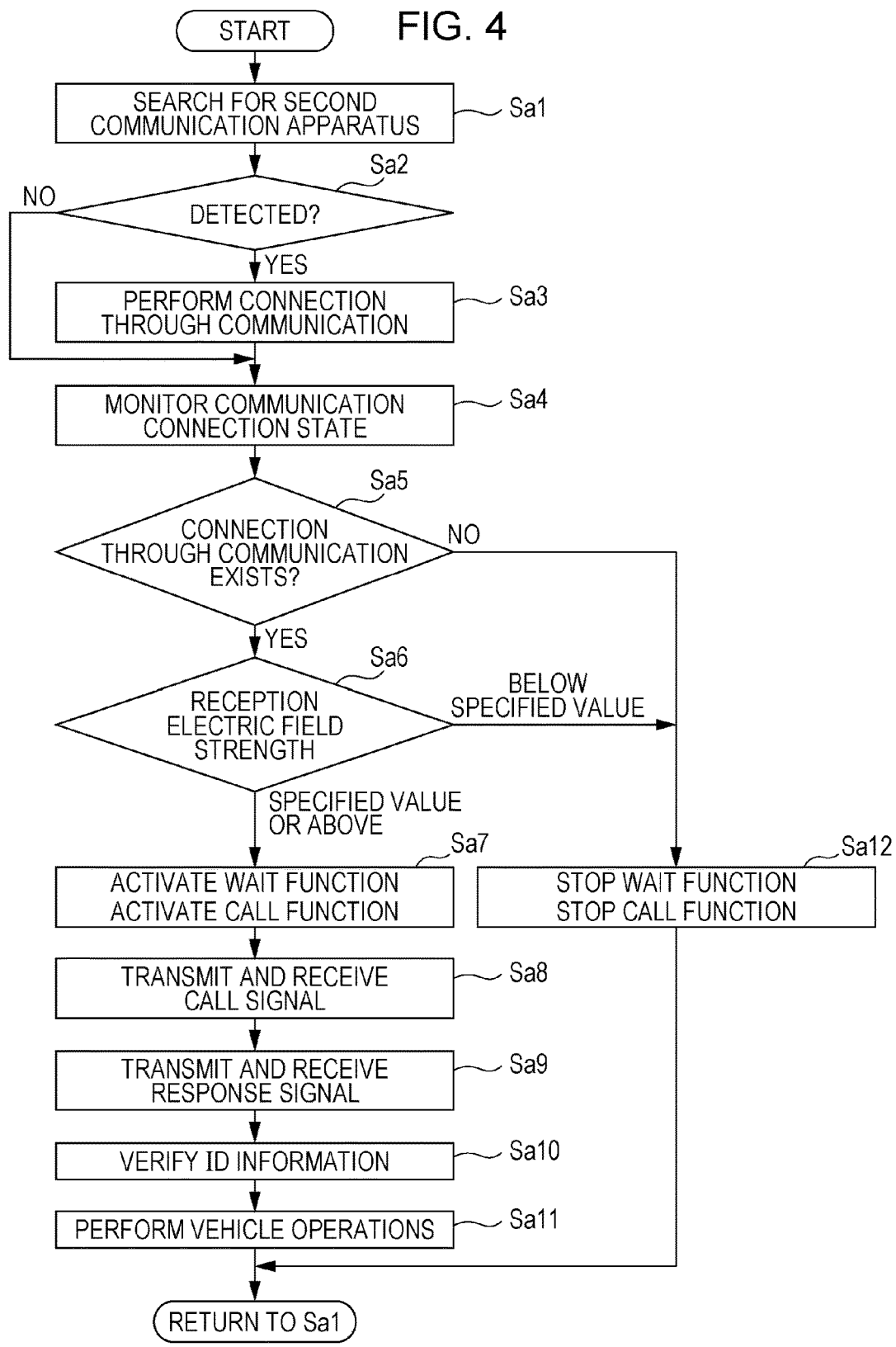

KEYLESS ENTRY SYSTEM

CLAIM OF PRIORITY

This application is a Continuation of International Application No. PCT/JP2014/079336 filed on Nov. 5, 2014, which claims benefit of Japanese Patent Application No. 2013-231057 filed on Nov. 7, 2013. The entire contents of each application noted above are hereby incorporated by reference.

BACKGROUND

1. Field of the Disclosure

The present disclosure relates to a keyless entry system and specifically to a keyless entry system that can suppress the power consumption of an in-vehicle apparatus or a mobile apparatus when the mobile apparatus is not in use.

2. Description of the Related Art

A widely used keyless entry system allows a vehicle operation such as locking/unlocking of the door of a vehicle to be performed without using a mechanical key, by utilizing wireless communication between an in-vehicle apparatus mounted in a vehicle and a mobile apparatus carried by a user of the vehicle. In such a keyless entry system, usually, the in-vehicle apparatus transmits a wireless signal having a frequency (30 kHz to 300 kHz) in the LF (low frequency) band to the mobile apparatus and, in correspondence with this, the mobile apparatus transmits a wireless signal having a frequency (300 MHz to 3 GHz) in the UHF (ultra high frequency) band to the in-vehicle apparatus, thereby performing wireless communication between the in-vehicle apparatus and the mobile apparatus. For example, verification of ID information or transmission and reception of operation information regarding vehicle operations are performed by utilizing wireless communication between the in-vehicle apparatus and the mobile apparatus.

Recently, a keyless entry system, in which an in-vehicle apparatus and a mobile apparatus further include two-way communication means supporting the short-distance wireless communication standard such as Bluetooth (registered trademark) or Bluetooth (registered trademark) Low Energy, and which can send and receive more complex information by utilizing two-way communication between the in-vehicle apparatus and mobile apparatus has been put into use. In such a keyless entry system, the power consumption of the in-vehicle apparatus and mobile apparatus has increased in accordance with an increase in communication functions. Hence, it is preferable that by detecting a state in which the mobile apparatus is not in use (non-use state of the mobile apparatus), part of the communication function of the in-vehicle apparatus or the mobile apparatus be stopped when the mobile apparatus is not in use (non-use time of the mobile apparatus), thereby suppressing power consumption in the in-vehicle apparatus or mobile apparatus.

Proposed keyless entry systems that can suppress the power consumption of an in-vehicle apparatus or a mobile apparatus while the mobile apparatus is not in use include, for example, a smart entry system (keyless entry system) according to Japanese Unexamined Patent Application Publication No. 2012-227586 and a security system (keyless entry system) according to Japanese Unexamined Patent Application Publication No. 2011-184959. FIG. 7 is an explanatory diagram illustrating the configuration of a smart entry system 201 according to Japanese Unexamined Patent Application Publication No. 2012-227586. FIG. 8 is an explanatory diagram illustrating the configuration of a security system 301 according to Japanese Unexamined Patent Application Publication No. 2011-184959.

Referring to FIG. 7, the smart entry system 201 according to Japanese Unexamined Patent Application Publication No. 2012-227586 includes an in-vehicle wireless communication apparatus 210 (in-vehicle apparatus) and a mobile wireless communication apparatus 220 (mobile apparatus). The in-vehicle wireless communication apparatus 210 includes an electronic control apparatus 211 formed of a transmission unit 211a, a reception unit 211b, and a control unit 211c. The transmission unit 211a transmits a wireless signal to the mobile wireless communication apparatus 220. The reception unit 211b receives a wireless signal from the mobile wireless communication apparatus 220. The control unit 211c, in accordance with communication with the mobile wireless communication apparatus 220, controls in-vehicle equipment such as an engine ECU 230, a door lock ECU 231, and the like through an in-vehicle LAN 232.

The mobile wireless communication apparatus 220 includes an LF reception unit 221, an RF transmission unit 222, an operation unit 223, a battery 224, relay switches 225, a vibration power generation device 226, a vibration component determination circuit 227, and a control unit 228. The LF reception unit 221 receives a wireless signal from the in-vehicle wireless communication apparatus 210. The RF transmission unit 222 transmits a wireless signal to the in-vehicle wireless communication apparatus 210. The control unit 228 controls the LF reception unit 221, the RF transmission unit 222, and the like. The battery 224 supplies power to the LF reception unit 221, the RF transmission unit 222, and the like. Power supply to the LF reception unit 221 and the RF transmission unit 222 can be stopped using the respective relay switches 225.

The vibration power generation device 226 outputs a voltage that varies on the basis of vibration transmitted to the mobile wireless communication apparatus 220. The vibration component determination circuit 227 detects a state in which vibration is not being transmitted to the mobile wireless communication apparatus 220 as a non-use state of the mobile wireless communication apparatus 220 on the basis of the output voltage of the vibration power generation device 226. The mobile wireless communication apparatus 220, upon detection of the non-use state of the mobile wireless communication apparatus 220, stops power supply from the battery 224 to the LF reception unit 221 and stops the reception function of the LF reception unit 221.

Referring to FIG. 8, the security system 301 according to Japanese Unexamined Patent Application Publication No. 2011-184959 includes an electronic key 302 (mobile apparatus) and a security apparatus 303 (in-vehicle apparatus). The security apparatus 303 includes a vehicle external transmission circuit 331, a vehicle external transmission antenna 332, a vehicle internal transmission circuit 333, a vehicle internal transmission antenna 334, a reception antenna 335, a receiver circuit 336, and a verification control apparatus 337. The vehicle external transmission circuit 331 transmits a wireless signal to the electronic key 302 through the vehicle external transmission antenna 332. The vehicle internal transmission circuit 333 transmits a wireless signal to the electronic key 302 through the vehicle internal transmission antenna 334. The receiver circuit 336 receives a wireless signal from the electronic key 302 through the reception antenna 335. The verification control apparatus 337 controls various pieces of in-vehicle equipment (not-illustrated) in accordance with communication between the electronic key 302 and the security apparatus 303.

The electronic key 302 includes a reception antenna 321, a receiver circuit 322, a microcomputer 323, a transmission circuit 324, a transmission antenna 325, and a vibration sensor 326. The receiver circuit 322 receives a wireless signal from the security apparatus 303 through the reception antenna 321. The transmission circuit 324 transmits a wireless signal to the security apparatus 303 through the transmission antenna 325. The microcomputer 323 controls the receiver circuit 322, the transmission circuit 324, and the like. The vibration sensor 326 detects whether or not the electronic key 302 is vibrating.

The electronic key 302 stops waiting for a wireless signal from the security apparatus 303 in the case where the doors of a vehicle in which the security apparatus 303 is mounted are locked and where the vibration sensor 326 detects a state in which the electronic key 302 is not vibrating as the non-use state of the electronic key 302, whereby the non-use state of the electronic key 302 is detected.

In this manner, the smart entry system 201 according to Japanese Unexamined Patent Application Publication No. 2012-227586 and the security system 301 according to Japanese Unexamined Patent Application Publication No. 2011-184959, detect the non-use state of a mobile apparatus on the basis of whether or not the vibration of the mobile apparatus exists, and suppress the power consumption of the mobile apparatus by stopping a portion of the communication functions of the mobile apparatus during the non-use time of the mobile apparatus.

Note that in Japanese Unexamined Patent Application Publication No. 2012-227586 and Japanese Unexamined Patent Application Publication No. 2011-184959, a method of suppressing the power consumption of an in-vehicle apparatus is not disclosed, but by detecting the non-use state of a mobile apparatus by using a method similar to that described above, the power consumption of an in-vehicle apparatus may also be suppressed by stopping part of the communication function of the in-vehicle apparatus during the non-use time of the mobile apparatus.

However, in both of the smart entry system 201 in Japanese Unexamined Patent Application Publication No. 2012-227586 and the security system 301 in Japanese Unexamined Patent Application Publication No. 2011-184959, vibration detection means for detecting the vibration of a mobile apparatus is required. Usually, such vibration detection means has a complex configuration, resulting in a mobile apparatus having a complex configuration. This leads to an increase in cost of the mobile apparatus.

SUMMARY

A keyless entry system includes: a first communication apparatus and a second communication apparatus. The keyless entry system activates equipment that is a keyless entry target by utilizing wireless communication between the first communication apparatus and the second communication apparatus. The first communication apparatus includes: a first transmitter configured to transmit a first wireless signal to the second communication apparatus; a first receiver configured to receive a second wireless signal from the second communication apparatus; and a first two-way communication device configured to perform two-way communication with the second communication apparatus by using a third wireless signal. The second communication apparatus includes: a second receiver configured to receive the first wireless signal from the first communication apparatus; a second transmitter configured to transmit the second wireless signal to the first communication apparatus; and a second two-way communication device configured to perform two-way communication with the first communication apparatus by using the third wireless signal. The first communication apparatus or the second communication apparatus includes: an electric field strength detector configured to detect electric field strength of a wireless signal used in wireless communication between the first communication apparatus and the second communication apparatus. The first transmitter includes a call function of periodically transmitting to the second communication apparatus a call signal for calling for a response by using the first wireless signal. The second receiver includes a wait function of waiting for the first wireless signal from the first communication apparatus, and the first communication apparatus stops the call function of the first transmitter or the second communication apparatus stops the wait function of the second receiver in a case where the first communication apparatus and the second communication apparatus are not connected to each other through two-way communication or in a case where the electric field strength detected by the electric field strength detector is less than a specified value.

In the keyless entry system having this configuration, the non-use state of the second communication apparatus can be detected on the basis of whether or not the first communication apparatus and the second communication apparatus are connected to each other through two-way communication or whether or not electric field strength detected by the electric field strength detector is less than a predetermined value. Hence, a vibration detector that detects the vibration of the second communication apparatus is not needed, whereby the configuration of the second communication apparatus is simplified. Further, in the case where the non-use state of the second communication apparatus has been detected, undesirable power consumption of the first communication apparatus or the second communication apparatus can be suppressed as a result of the first communication apparatus stopping the call function of the first transmission means, or as a result of the second communication apparatus stopping the wait function of the second receiver. As a result, in the keyless entry system having this configuration, the configuration of the second communication apparatus can be simplified and the power consumption of the first communication apparatus or the second communication apparatus during the non-use time of the second communication apparatus can be suppressed.

BRIEF DESCRIPTION OF THE DRAWINGS

FIG. 2 is an explanatory diagram illustrating a usage example of the keyless entry system illustrated in FIG. 1;

FIG. 4 is a flowchart illustrating the steps of connection through communication according to the first embodiment of the present invention;

DESCRIPTION OF THE EXEMPLARY EMBODIMENTS

First Embodiment

Hereinafter, a first embodiment of the present invention will be described with reference to the drawings. Note that in the figures, descriptions will be made assuming that the X1 direction is the left direction, the X2 direction is the right direction, the Y1 direction is the forward direction, the Y2 direction is the backward direction, the Z1 direction is the upward direction, and the Z2 direction is the downward direction.

Figure 1:
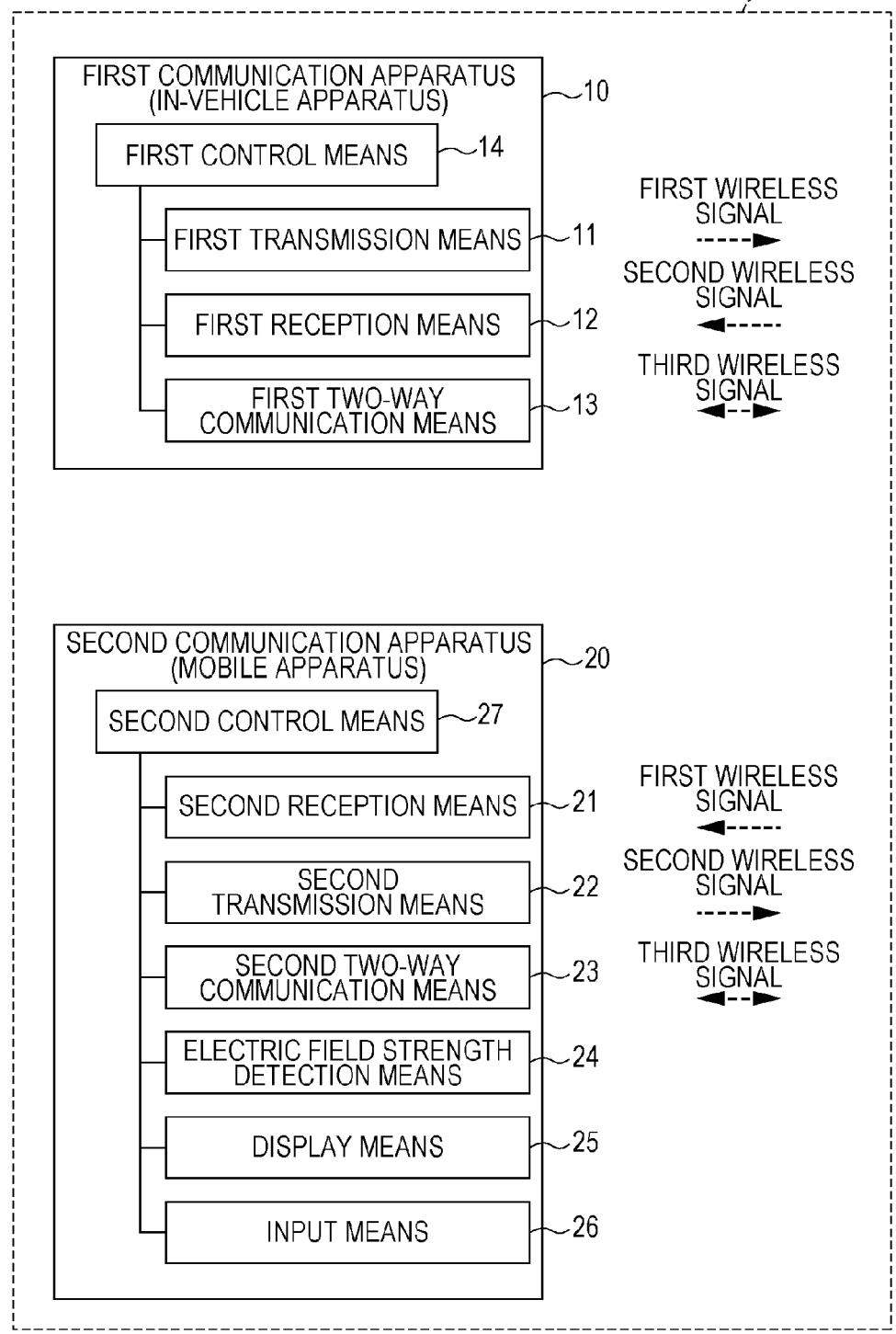
FIG. 1 is a block diagram illustrating the configuration of a keyless entry system according to a first embodiment of the present invention.
Figure 3A:
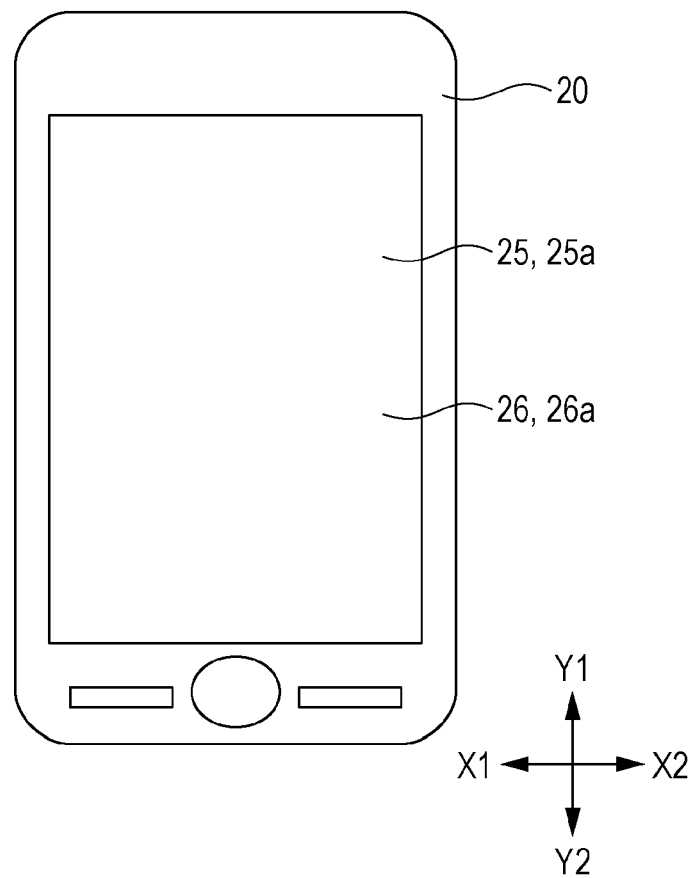
FIGS. 3A and 3B are explanatory diagrams illustrating the configuration of a second communication apparatus illustrated in FIG. 1.
Figure 3B:
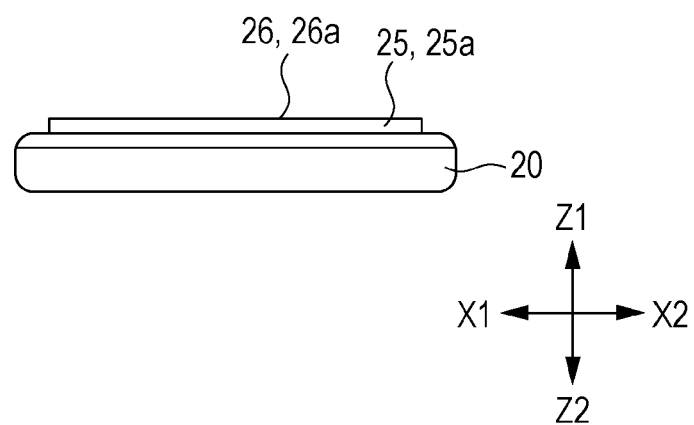

First, the configuration of a keyless entry system 1 according to the first embodiment of the present invention will be described with reference to FIG. 1 to FIG. 3B. FIG. 1 is a block diagram illustrating the configuration of the keyless entry system 1 according to the first embodiment of the present invention. FIG. 2 is an explanatory diagram illustrating a usage example of the keyless entry system 1 illustrated in FIG. 1. FIGS. 3A and 3B are explanatory diagrams illustrating the configuration of a second communication apparatus 20 illustrated in FIG. 1. FIG. 3A is a top view and FIG. 3B is a side view.

Referring to FIG. 1, the keyless entry system 1 includes a first communication apparatus 10 and the second communication apparatus 20. The first communication apparatus 10 is an in-vehicle apparatus mounted in a vehicle 30 as illustrated in FIG. 2. In-vehicle equipment including door lock apparatuses 32 for locking and unlocking doors 31 of the vehicle 30 is mounted in the vehicle 30. The second communication apparatus 20 is a mobile apparatus carried by a user 40 of the vehicle 30. In the present embodiment, the second communication apparatus 20 is a mobile information terminal called a smart phone including the function of electronic keys.

In the keyless entry system 1, a first wireless signal which is a wireless signal (electromagnetic wave signal) having a frequency (30 kHz to 300 kHz) in the LF (low frequency) band is transmitted from the first communication apparatus 10 to the second communication apparatus 20, and a second wireless signal which is a wireless signal (electromagnetic wave signal) having a frequency (300 MHz to 3 GHz) in the UHF (ultra high frequency) band is transmitted from the second communication apparatus 20 to the first communication apparatus 10, whereby wireless communication between the first communication apparatus 10 and the second communication apparatus 20 can be performed. Further, in the keyless entry system 1, two-way communication between the first communication apparatus 10 and the second communication apparatus 20 can also be performed by using a third wireless signal which is a wireless signal (electromagnetic wave signal) having a frequency in the UHF band.

Hereinafter, wireless communication between the first communication apparatus 10 and the second communication apparatus 20 using the first wireless signal and the second wireless signal is simply called wireless communication using the first wireless signal and the second wireless signal. Further, two-way communication between the first communication apparatus 10 and the second communication apparatus 20 using the third wireless signal is simply called two-way communication using the third wireless signal. Further, wireless communication using the first wireless signal and the second wireless signal and the two-way communication using the third wireless signal are collectively called simply wireless communication between the first communication apparatus 10 and the second communication apparatus 20.

In the keyless entry system 1, various types of instruction and information regarding vehicle operations are transmitted by utilizing wireless communication between the first communication apparatus 10 and the second communication apparatus 20 described above. The vehicle operations such as locking/unlocking of the doors 31 of the car 30, lighting of welcome lights so that the lights of the vehicle 30 are lit when the user 40 approaches the vehicle 30, transmission of vehicle information such as information about the position of the vehicle 30, information about remaining fuel, information about the air pressure of the tires, and the like are performed without using a mechanical key.

Note that the first communication apparatus 10 is connected to an in-vehicle battery (not illustrated), and the in-vehicle battery supplies power to the various circuits of the first communication apparatus 10. Further, a battery (not illustrated) is included in the second communication apparatus 20 and supplies power to the various circuits of the second communication apparatus 20.

Next, the configuration of the first communication apparatus 10 will be described. Referring to FIG. 1, the first communication apparatus 10 includes first transmitter or transmission means 11, first receiver or reception means 12, first two-way communication device 13, and first controller or control means 14.

The first transmission means 11 transmits the first wireless signal to the second communication apparatus 20. For example, a signal having a frequency in the 120 kHz band is used as the first wireless signal. The first wireless signal can be modulated, for example, AM modulated. As a result of the first wireless signal being modulated, various types of instruction or information can be transmitted from the first communication apparatus 10 to the second communication apparatus 20. The transmission range of the first wireless signal is limited to within the vehicle 30 or the vicinity of the doors 31.

The first reception means 12 receives the second wireless signal transmitted from the second communication apparatus 20. For example, a signal having a frequency in the 300 MHz band is used as the second wireless signal. The second wireless signal can be modulated, for example, FM modulated. As a result of the second wireless signal being modulated, various types of instruction or information can be transmitted from the second communication apparatus 20 to the first communication apparatus 10. The transmission range of the second wireless signal is about several meters from the second communication apparatus 20.

The first two-way communication device 13 is communication means supporting short-distance wireless communication standards such as Bluetooth (registered trademark), Bluetooth (registered trademark) Low Energy, and the like. The first two-way communication device 13 performs two-way communication with the second communication apparatus 20 by using the third wireless signal. Various types of instruction and information can be transmitted between the first communication apparatus 10 and the second communication apparatus 20 through two-way communication using the third wireless signal. Examples of the third wireless signal include a signal having a frequency in the 2.4 GHz band. The transmission range of the third wireless signal is about several meters from the vehicle 30.

The first control unit or control means 14 controls the first transmission means 11, the first reception means 12, and the first two-way communication device 13. Further, the first control means 14 acquires various types of information from the second communication apparatus 20 by utilizing wireless communication between the first communication apparatus 10 and the second communication apparatus 20. In the case where ID information is acquired from the second communication apparatus 20, the first control means 14 performs verification with the ID information stored therein. The first control means 14 monitors the connection state of wireless communication between the first communication apparatus 10 and the second communication apparatus 20. The first control means 14 performs various types of determination on the basis of information acquired from the second communication apparatus 20 and information monitored by itself.

The first control means 14 is connected to the in-vehicle equipment such as the door lock apparatus 32 through an in-vehicle network or the like (not illustrated), and sends various instructions regarding vehicle operations to pieces of in-vehicle equipment.

Next, the configuration of the second communication apparatus 20 will be described. Referring to FIG. 1, the second communication apparatus 20 includes second receiver or reception means 21, second transmitter or transmission means 22, second two-way communication means 23, electric field strength detector 24, display 25, input device 26, and second controller or control means 27.

The second reception means 21 receives the first wireless signal transmitted from the first communication apparatus 10. The second transmission means 22 transmits the second wireless signal to the first communication apparatus 10. By transmitting the first wireless signal from the first transmission means 11 of the first communication apparatus 10 to the second reception means 21 of the second communication apparatus 20, and transmitting the second wireless signal from the second transmission means 22 of the second communication apparatus 20 to the first reception means 12 of the first communication apparatus 10, wireless communication between the first communication apparatus 10 and the second communication apparatus 20 using the first wireless signal and the second wireless signal can be performed.

The second two-way communication means 23 is two-way communication means supporting short-range wireless communication standards such as Bluetooth, Bluetooth Low Energy, and the like. The second two-way communication means 23 performs two-way communication with the first communication apparatus 10 by using the third wireless signal. Two-way communication using the third wireless signal between the first communication apparatus 10 and the second communication apparatus 20 can be performed by the first two-way communication device 13 of the first communication apparatus 10 and the second two-way communication means 23 of the second communication apparatus 20.

The electric field strength detection means 24 detects the reception electric field strength of the third wireless signal received by the second two-way communication means 23. Since the reception electric field strength of the third wireless signal decreases as the distance between the first communication apparatus 10 and the second communication apparatus 20 increases, the reception electric field strength detected by the electric field strength detection means 24 can be used as information for estimating the distance between the user 40 carrying the second communication apparatus 20 and the vehicle 30 in which the first communication apparatus 10 is mounted.

The display means 25 is a display apparatus called a liquid crystal panel. Referring to FIGS. 3A and 3B, the display means 25 is arranged in a predetermined location on the upper-surface of the second communication apparatus 20. Various types of information can be displayed on a display screen 25a of the display means 25.

The input means 26 is an input apparatus called a touch panel. Referring to FIGS. 3A and 3B, the input means 26 is arranged so as to be overlaid on the upper surface of the display screen 25a of the display means 25. The user 40 can perform various input operations by touching an operation surface 26a of the input means 26 with a finger tip, for example.

The second control means 27 controls the second reception means 21, the second transmission means 22, and the second two-way communication means 23. Further, the second control means 27 acquires various types of information from the first communication apparatus 10 by utilizing wireless communication between the first communication apparatus 10 and the second communication apparatus 20. The second control means 27 monitors the connection state of wireless communication between the first communication apparatus 10 and the second communication apparatus 20. The second control means 27 monitors the reception electric field strength detected by the electric field strength detection means 24 and input operations performed on the input means 26. The second control means 27 makes various types of determination on the basis of the information acquired from the first communication apparatus 10 and the information monitored by itself.

Next, the function of wireless communication according to the present embodiment will be described. As described above, wireless communication using the first wireless signal and the second wireless signal can be performed in the keyless entry system 1. Further, two-way communication using the third wireless signal can also be performed in the keyless entry system 1.

By utilizing wireless communication using the first wireless signal and the second wireless signal, a call signal for calling for a response from the second communication apparatus 20, a request signal requesting the second communication apparatus 20 to transmit the ID information, and the like are transmitted from the first communication apparatus 10 to the second communication apparatus 20. Further, by utilizing wireless communication using the first wireless signal and the second wireless signal, a response signal corresponding to the call signal, ID information for verifying whether or not the mobile apparatus is a registered mobile apparatus, and the like are transmitted from the second communication apparatus 20 to the first communication apparatus 10. By utilizing two-way communication using the third wireless signal, monitored information, an instruction regarding setting of communication functions, operation information corresponding to an input operation, vehicle information, and the like are transmitted between the first communication apparatus 10 and the second communication apparatus 20.

Note that the first transmission means 11 of the first communication apparatus 10 has a call function of periodically transmitting to the second communication apparatus 20, by using the first wireless signal, a call signal requesting for a response from the second communication apparatus 20.

Such a call function is utilized, for example, in the case where it is determined whether or not the user 40 carrying the second communication apparatus 20 is near the doors 31 of the vehicle 30. When the second communication apparatus 20 is not in use, undesirable power consumption of the first communication apparatus 10 is suppressed by stopping the call function.

The second reception means 21 of the second communication apparatus 20 has a wait function of waiting for the first wireless signal transmitted from the first communication apparatus 10. As a result of the second reception means 21 actuating the wait function, reception of the first wireless signal transmitted from the first communication apparatus 10 becomes possible. When the second communication apparatus 20 is not in use, undesirable power consumption of the second communication apparatus 20 is suppressed by stopping the wait function.

Hereinafter, a period of time when the second communication apparatus 20 is not in use is simply called the non-use time of the second communication apparatus 20, and a state in which the second communication apparatus 20 is not in use is simply called the non-use state of the second communication apparatus 20. The keyless entry system 1 of the present embodiment is a system in which it is assumed that the first communication apparatus 10 and the second communication apparatus 20 are connected to each other through two-way communication and, hence, in the case where the first communication apparatus 10 and the second communication apparatus 20 are not connected to each other through two-way communication, vehicle operations utilizing wireless communication between the first communication apparatus 10 and the second communication apparatus 20 cannot be performed. Hence, in such a case, it is determined that the second communication apparatus 20 is in a non-use state.

In the case where the user 40 carrying the second communication apparatus 20 is spaced apart from the vehicle 30 by several meters or more, the reception electric field strength of the third wireless signal used in two-way communication is decreased and two-way communication using the third wireless signal becomes difficult. Since the transmission range of the first wireless signal is limited to within the vehicle 30 or the vicinity of the doors 31, wireless communication using the first wireless signal and the second wireless signal also becomes impossible in the case where the distance between the user 40 and the vehicle 30 is larger than several meters. Hence, also in such a case, it is determined that the second communication apparatus 20 is in a non-use state. Note that in the present embodiment, it is determined that the second communication apparatus 20 is in a non-use state in the case where the distance between the user 40 and the vehicle 30 is several meters or more and the reception electric field strength of the third wireless signal becomes lower than a specified value.

Now, vehicle operations according to the present embodiment will be described. As described above, in the keyless entry system 1, vehicle operations such as locking/unlocking of the doors 31 of the vehicle 30, lighting of welcome lights, and the transmission of vehicle information are performed by utilizing wireless communication between the first communication apparatus 10 and the second communication apparatus 20.

Unlocking of the doors 31 of the vehicle 30 is automatically performed when the user 40 carrying the second communication apparatus 20 approaches the vicinity of the doors 31 of the vehicle 30. Locking of the doors 31 of the vehicle 30 is automatically performed when the user 40 leaves the vehicle 30 and moves away from the vicinity of the doors 31 of the vehicle 30. Determination of whether or not the user 40 has approached the vicinity of the doors 31 of the vehicle 30 or determination of whether or not the user 40 has moved away from the vicinity of the doors 31 of the vehicle 30 is performed by utilizing wireless communication using the first wireless signal and the second wireless signal.

As described above, the transmission range of the first wireless signal is limited to within the vehicle 30 or the vicinity of the doors 31. Hence, in the present embodiment, a call signal is periodically transmitted to the second communication apparatus 20 by using the first wireless signal, and in the case where a response signal corresponding to the call signal is transmitted from the second communication apparatus 20, it is determined that the user 40 has approached the vicinity of the doors 31 of the vehicle 30. In the case where the response signal corresponding to the call signal is no longer transmitted, it is determined that the user 40 has moved away from the vicinity of the doors 31 of the vehicle 30.

Lighting of welcome lights is automatically performed jointly with the unlocking of the doors 31 of the vehicle 30 as the user 40 carrying the second communication apparatus 20 approaches the vehicle 30.

The vehicle information is transmitted in correspondence with an input operation for the input means 26 of the second communication apparatus 20. When a predetermined input operation is performed for the input means 26, operation information corresponding to the input operation is transmitted from the second communication apparatus 20 to the first communication apparatus 10 by utilizing two-way communication using the third wireless signal. Vehicle information corresponding to the operation information is transmitted from the first communication apparatus 10 to the second communication apparatus 20 by utilizing two-way communication using the third wireless signal. The transmitted vehicle information is displayed by the display means 25 of the second communication apparatus 20.

Note that when such a vehicle operation is performed, the first control means 14 of the first communication apparatus 10 acquires the ID information from the second communication apparatus 20 by utilizing wireless communication between the first communication apparatus 10 and the second communication apparatus 20, and performs verification of the acquired ID information. Then a predetermined vehicle operation is performed in the case where it is determined, on the basis of the verification result of the ID information, by the first control means 14 of the first communication apparatus 10 that the vehicle operation is "permitted".

Next, a method for connection through communication according to the present embodiment will be described with reference to FIG. 4. FIG. 4 is a flowchart illustrating the steps of connection through communication according to the first embodiment of the present invention.

Referring to FIG. 4, first, the first two-way communication device 13 of the first communication apparatus 10 searches for the second communication apparatus 20 enabling connection through two-way communication (step Sa1). Then, the first control means 14 of the first communication apparatus 10 performs determination on the basis of whether or not the second communication apparatus 20 enabling connection through communication is detected (step Sa2). In the case where the second communication apparatus 20 enabling connection through communication is not detected in step Sa2, the flow proceeds to step Sa4. In the case where the second communication apparatus 20 enabling connection through communication is detected in step Sa2, connection through two-way communication is performed between the first communication apparatus 10 and the second communication apparatus 20 (step Sa3). Then, the flow proceeds to step Sa4.

Then in step Sa4, the first control means 14 of the first communication apparatus 10 and the second control means 27 of the second communication apparatus 20 monitor the connection state of two-way communication. Next, the first control means 14 of the first communication apparatus 10 and the second control means 27 of the second communication apparatus 20 perform determination on the basis of whether or not connection through two-way communication exists (step Sa5).

In the case where the first communication apparatus 10 and the second communication apparatus 20 are not in a state of being connected to each other through two-way communication in step Sa5, it is determined that the second communication apparatus 20 is in a non-use state, and the flow proceeds to step Sa12. In the case where the first communication apparatus 10 and the second communication apparatus 20 are in a state of being connected to each other through two-way communication in step Sa5, the first control means 14 of the first communication apparatus 10 and the second control means 27 of the second communication apparatus 20 perform determination on the basis of the reception signal strength of the third wireless signal used in two-way communication (step Sa6).

In the case where the reception electric field strength of the third wireless signal is lower than a specified value in step Sa6, it is determined that the second communication apparatus 20 is in a non-use state, and the flow proceeds to step Sa12. In the case where the reception electric field strength of the third wireless signal is higher than or equal to the specified value in step Sa6, the first control means 14 of the first communication apparatus 10 actuates the call function of the first transmission means 11, and the second control means 27 of the second communication apparatus 20 actuates the wait function of the second reception means 21 (step Sa7). As a result, transmission and reception of a call signal between the first communication apparatus 10 and the second communication apparatus 20 become possible.

Next, the first transmission means 11 of the first communication apparatus 10 transmits a call signal to the second communication apparatus 20 by using the first wireless signal and the second reception means 21 of the second communication apparatus 20 receives the call signal (step Sa8). Then, a response signal corresponding to the call signal is transmitted together with ID information by using the second wireless signal, and the first reception means 12 of the first communication apparatus 10 receives the response signal and ID information (step Sa9).

Next, the first control means 14 of the first communication apparatus 10 verifies the ID information (step Sa10). Then, various vehicle operations are performed on the basis of the verification result of the ID information (step Sa11). After that, the flow goes back to step Sa1, and step Sa1 and subsequent steps are repeated.

In association with step Sa5 and step Sa6, in step Sa12, the first control means 14 of the first communication apparatus 10 stops the call function of the first transmission means 11, and the second control means 27 of the second communication apparatus 20 stops the wait function of the second reception means 21. As a result, the power consumption of the first communication apparatus 10 and the second communication apparatus 20 can be suppressed, although vehicle operations cannot be performed. After that, the flow goes back to step Sa1, and step Sa1 and subsequent steps are repeated.

In the keyless entry system 1, the first communication apparatus 10 and the second communication apparatus 20 are connected to each other through communication in accordance with the steps described above, and various vehicle operations are performed by utilizing wireless communication between the first communication apparatus 10 and the second communication apparatus 20.

Next, the advantageous effects of the present embodiment will be described. In the keyless entry system 1 of the present embodiment, the non-use state of the second communication apparatus 20 is detected on the basis of whether or not the first communication apparatus 10 and the second communication apparatus 20 are connected to each other through two-way communication or whether or not the electric field strength detected by the electric field strength detection means 24 is smaller than a specified value. Hence, vibration detection means for detecting the vibration of the second communication apparatus 20 is not needed, whereby the configuration of the second communication apparatus 20 is simplified. In addition, in the keyless entry system 1 of the present embodiment, in the case where the non-use state of the second communication apparatus 20 is detected, undesirable power consumption of the first communication apparatus 10 can be suppressed as a result of the first communication apparatus 10 stopping the call function of the first transmission means 11. Further, in the case where the non-use state of the second communication apparatus 20 is detected, undesirable power consumption of the second communication apparatus 20 can be suppressed as a result of the second communication apparatus 20 stopping the wait function of the second reception means 21. As a result, in the keyless entry system 1, the configuration of the second communication apparatus 20 can be simplified, and the power consumption of the first communication apparatus 10 and the power consumption of the second communication apparatus 20 can be suppressed when the second communication apparatus 20 is not in use.

Further, in the keyless entry system 1 of the present embodiment, in the case where the non-use state of the second communication apparatus 20 is detected, the first communication apparatus 10 stops the call function of the first transmission means 11, thereby restricting the case where an unauthorized third party other than the user 40 receives the call signal from the first communication apparatus 10 by using a communication apparatus other than the second communication apparatus 20 owned by the user 40. Further, the case where a third party other than the user 40 attempts to perform unauthorized access to the first communication apparatus 10 by utilizing the call signal received in an unauthorized manner can also be restricted. As a result, system security can be enhanced in the keyless entry system 1.

Further, in the keyless entry system 1 of the present embodiment, the first communication apparatus 10 is an in-vehicle apparatus mounted in the vehicle 30, the second communication apparatus 20 is a mobile apparatus carried by the user 40 of the vehicle 30, and equipment which is a keyless entry target is in-vehicle equipment such as the door lock apparatus 32 mounted in the vehicle 30. In this manner, for example, usage of the keyless entry system 1 for the vehicle 30 realizes suppression of a decrease in the remaining capacity of a battery mounted in the vehicle 30 and realizes an increase in the lifetime of a battery housed in the second communication apparatus 20 which is a mobile apparatus.

Second Embodiment

Hereinafter, a second embodiment of the present invention will be described with reference to the drawings. Note that in the present embodiment, configurations which are the same as those of the first embodiment described above are denoted by the same reference symbols and detailed descriptions thereof are omitted.

Figure 5:
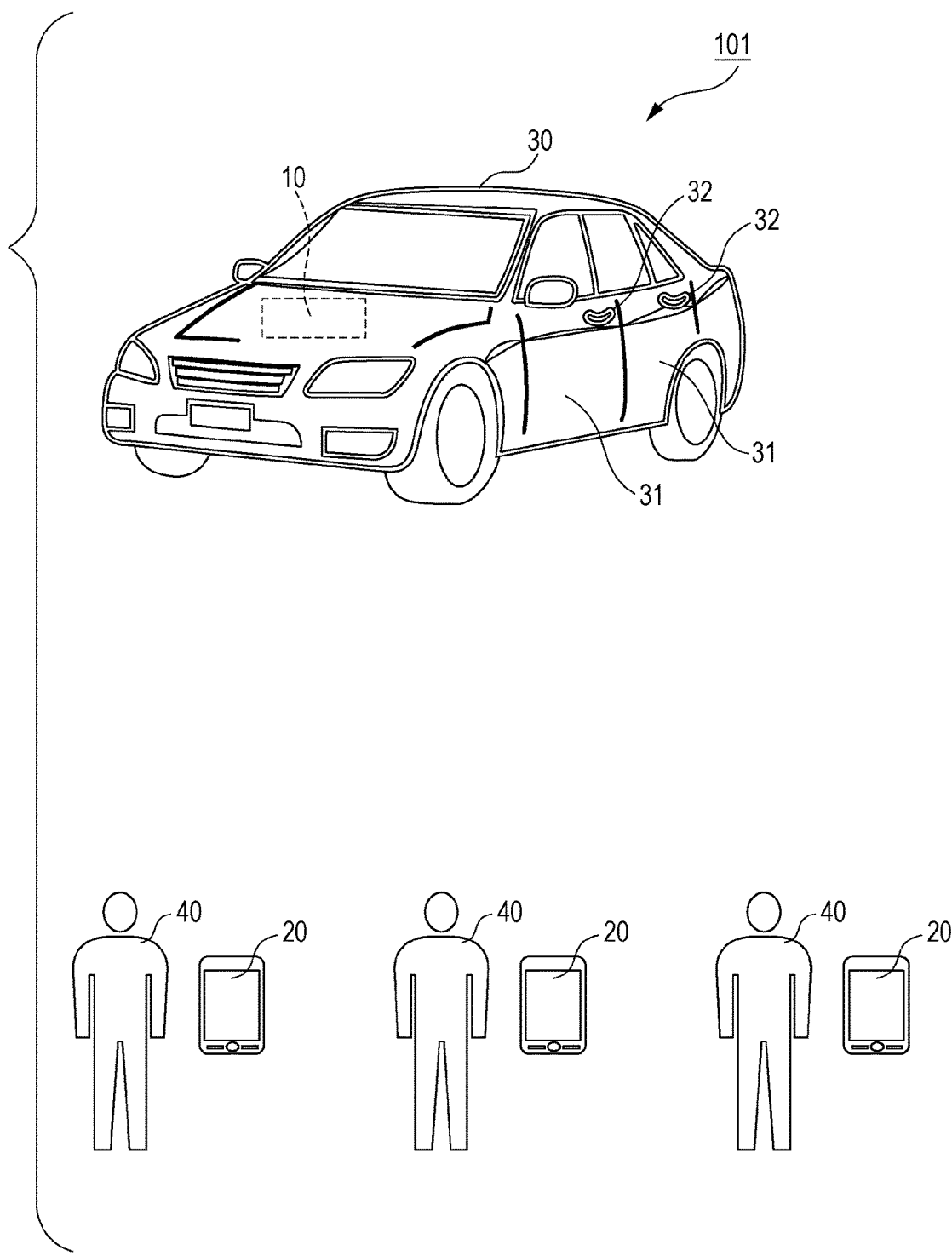
FIG. 5 is an explanatory diagram illustrating a usage example of a keyless entry system according to a second embodiment of the present invention.

First, the configuration of a keyless entry system 101 according to a second embodiment of the present invention will be described with reference to FIG. 5. FIG. 5 is an explanatory diagram illustrating a usage example of the keyless entry system 101 according to the second embodiment of the present invention.

Referring to FIG. 5, the keyless entry system 101 includes a first communication apparatus 10 and three second communication apparatuses 20. The first communication apparatus 10 is an in-vehicle apparatus mounted in a vehicle 30. The three second communication apparatuses 20 are mobile apparatuses respectively carried by three users 40 of the vehicle 30. One of the three users 40 is a driver of the vehicle 30, and the other two are passengers of the vehicle 30.

The configuration of the first communication apparatus 10 is the same as that of the first communication apparatus 10 described in the first embodiment. Similarly, the configuration of the second communication apparatuses 20 is the same as that of the second communication apparatus 20 described in the first embodiment.

In the present embodiment, the three second communication apparatuses 20 are respectively registered as mobile apparatuses of the vehicle 30. The first communication apparatus 10 can be connected to each of the three second communication apparatuses 20 through two-way communication using the third wireless signal. However, from the viewpoint of, for example, assuring a communication speed and maintaining security, the number of the second communication apparatuses 20 allowed to be simultaneously connected through two-way communication to the first communication apparatus 10 is limited to less than or equal to two. The method of connecting the first communication apparatus 10 to the second communication apparatuses 20 through two-way communication is publicly known and, hence, detailed explanation is omitted. Multiplexed connection based on time division multiplexing or multiplexed connection based on frequency division multiplexing may be used for implementation.

Next, vehicle operations according to the present embodiment will be described. In the keyless entry system 101, vehicle operations such as locking/unlocking of the doors 31 the vehicle 30, lighting of welcome lights, and transmission of vehicle information are performed by utilizing wireless communication between the first communication apparatus 10 and the second communication apparatuses 20, similarly to the keyless entry system 1 of the first embodiment.

However, in the present embodiment, in locking/unlocking of the doors 31 of the vehicle 30, determination of whether or not a user 40 is in the vicinity of the doors 31 of the vehicle 30 or whether or not the user 40 has moved away from the vicinity of the doors 31 of the vehicle 30 is not only performed by wireless communication using the first wireless signal and the second wireless signal but also may be performed by utilizing two-way communication using the third wireless signal. As described above, when the distance between the first communication apparatus 10 and the second communication apparatus 20 is increased, the reception electric field strength of the third wireless signal is decreased and, hence, the reception electric field strength of the third wireless signal detected by the electric field strength detection means 24 can be used as information for determining whether or not the user 40 has approached the vicinity of the doors 31 of the vehicle 30 or for determining whether or not the user 40 has moved away from the vicinity of the doors 31 of the vehicle 30.

In the present embodiment, in the case where at least one of the second communication apparatuses 20 is connected to the first communication apparatus 10 through two-way communication, the first communication apparatus 10 stops the call function of the first transmission means 11 and, by utilizing two-way communication using the third wireless signal, determines whether or not the user 40 has approached the vicinity of the doors 31 of the vehicle 30, and determines whether or not the user 40 has moved away from the vicinity of the doors 31 of the vehicle 30. Undesirable power consumption of the first communication apparatus 10 is suppressed by stopping the call function of the first transmission means 11.

In the present embodiment, the number of the second communication apparatuses 20 that can be simultaneously connected to the first communication apparatus 10 through two-way communication is limited to two or less. In the case where the first communication apparatus 10 and two of the second communication apparatuses 20 are connected through two-way communication, the second communication apparatus 20 which is not connected through two-way communication (hereinafter, called an unconnected second communication apparatus 20) cannot be used to perform vehicle operations and, hence, the unconnected second communication apparatus 20 need not activate the wait function to wait for a call signal.

Hence, in the present embodiment, in the case where the first communication apparatus 10 and two of the second communication apparatuses 20 are connected through two-way communication, undesirable power consumption of the second communication apparatus 20 is suppressed by stopping the wait function of the unconnected second communication apparatus 20. Examples of the method of stopping the wait function of the unconnected second communication apparatus 20 include a method in which by sending an instruction to all of the second communication apparatuses 20 by using the first wireless signal, the wait functions of all the second communication apparatuses 20 are stopped and then by utilizing two-way communication using the third wireless signal, only the wait function of the second communication apparatus 20 connected to the first communication apparatus 10 through two-way communication is activated.

Note that also in the present embodiment, verification of ID information is performed when vehicle operations are executed. In the present embodiment, in the case where the first transmission means 11 of the first communication apparatus 10 keeps a call function stopped, the first transmission means 11 transmits a request signal requesting transmission of ID information to a second communication apparatus 20 after temporarily activating a transmission function. The second transmission means 22 of the second communication apparatus 20 transmits ID information to the first communication apparatus 10 in response to the request signal, whereby transmission and reception of ID information between the first communication apparatus 10 and the second communication apparatus 20 are performed.

Figure 6:
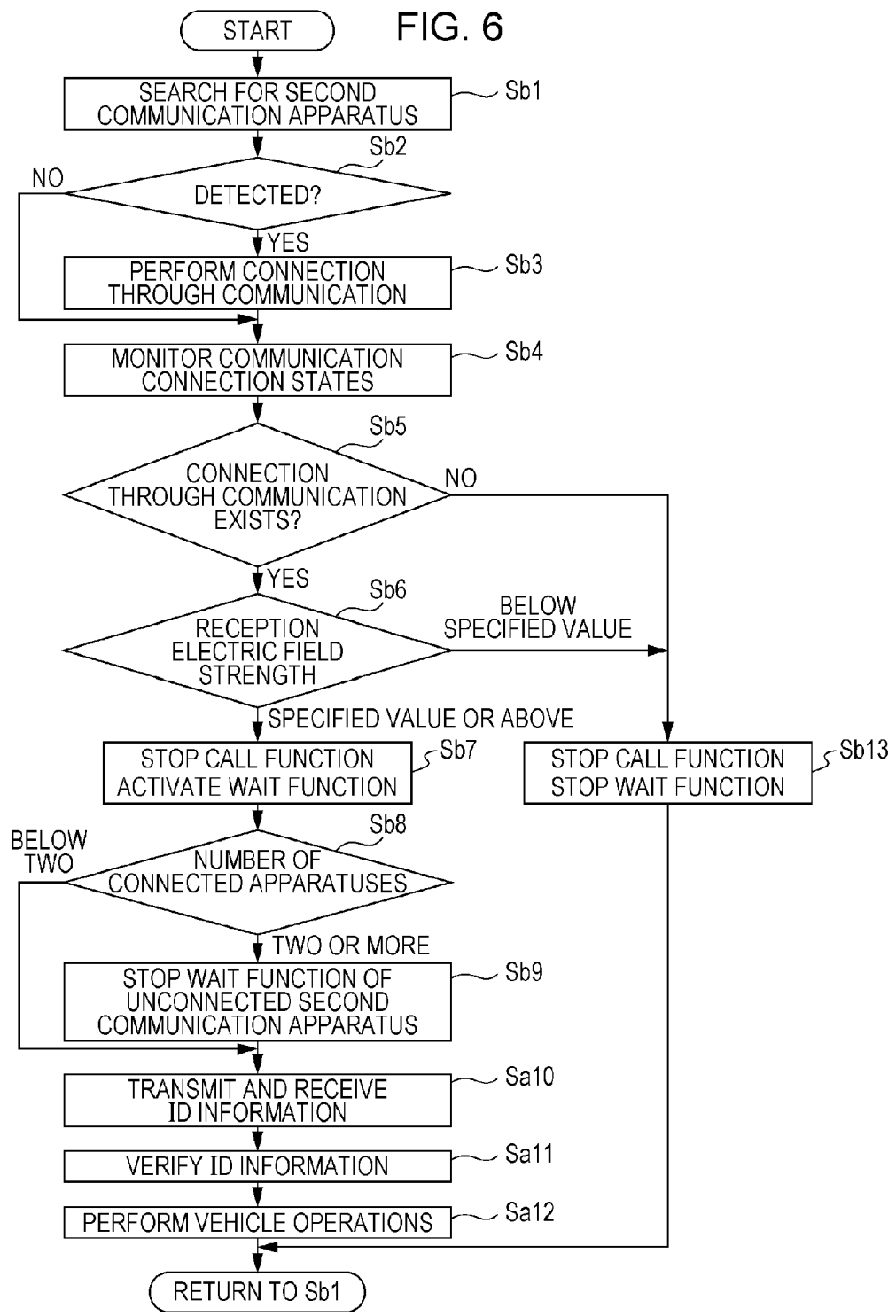
FIG. 6 is a flowchart illustrating the steps of connection through communication according to the second embodiment of the present invention.
Figure 7:
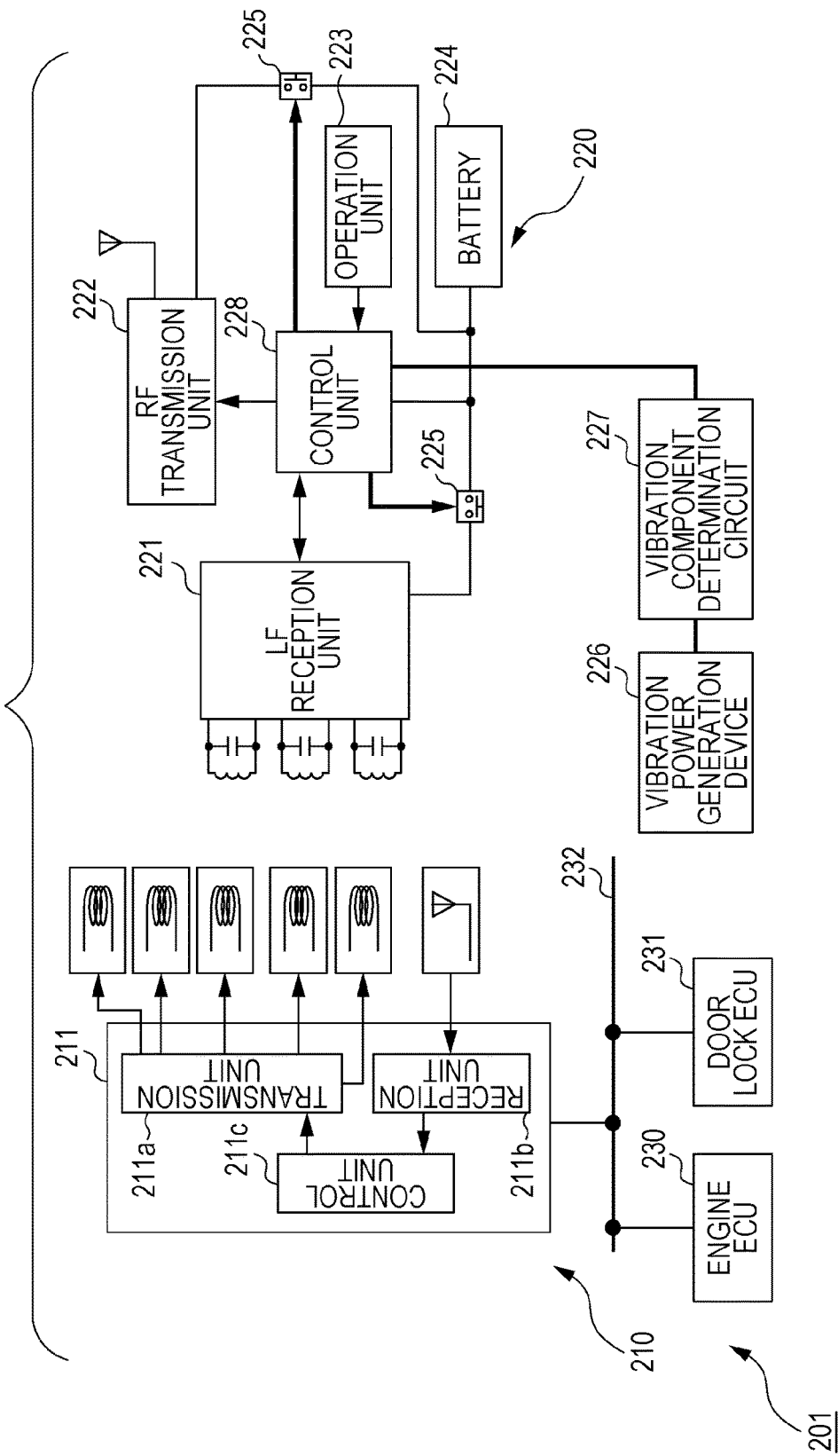
FIG. 7 is an explanatory diagram illustrating the configuration of a smart entry system according to Japanese Unexamined Patent Application Publication No. 2012-227586.
Figure 8:
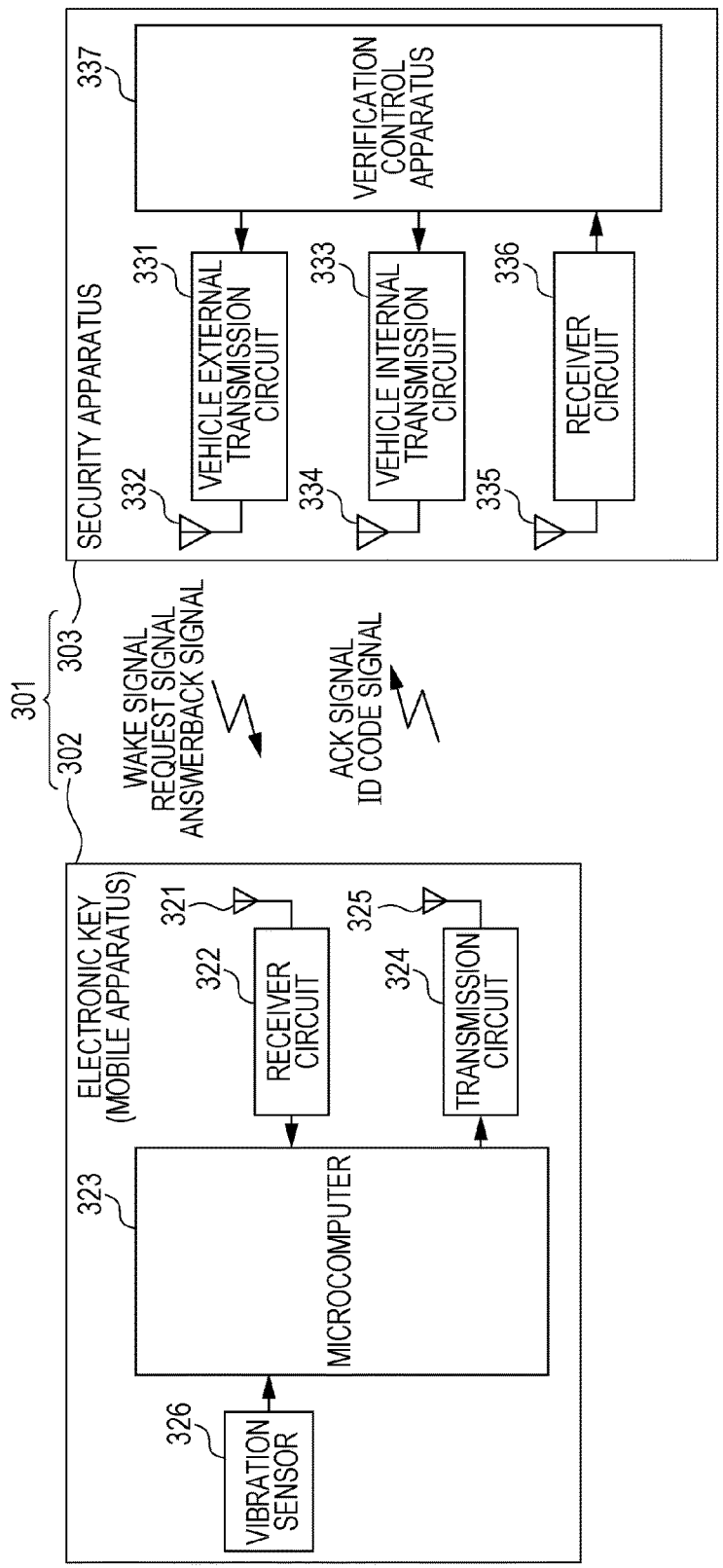
FIG. 8 is an explanatory diagram illustrating the configuration of a security system according to Japanese Unexamined Patent Application Publication No. 2011-184959.

Next, a method for connection through communication according to the present embodiment will be described with reference to FIG. 6. FIG. 6 is a flowchart illustrating the steps of connection through communication according to the second embodiment of the present invention.

Referring to FIG. 6, first, the first two-way communication device 13 of the first communication apparatus 10 searches for the one or more second communication apparatuses 20 enabling connection through two-way communication (step Sb1). Then, the first control means 14 of the first communication apparatus 10 performs determination on the basis of whether or not the one or more second communication apparatuses 20 enabling connection through communication are detected (step Sb2). In the case where the second communication apparatus 20 enabling connection through communication is not detected in step Sb2, the flow proceeds to step Sb4. In the case where the one or more second communication apparatuses 20 enabling connection through communication are detected in step Sb2, connection through two-way communication between the first communication apparatus 10 and the one or more second communication apparatus 20 is performed (step Sb3). Note that in the case where two or more of the second communication apparatuses 20 enabling connection through communication are detected in step Sb2, connection through two-way communication is performed between the first communication apparatus 10 and two of the second communication apparatuses 20. Then the flow proceeds to step Sb4.

Then in step Sb4, the first control means 14 of the first communication apparatus 10 and the second control means 27 of the second communication apparatus 20 monitor the connection state of communication between the first communication apparatus 10 and the one or more second communication apparatuses 20. Next, the first control means 14 of the first communication apparatus 10 and the second control means 27 of the one or more second communication apparatuses 20 perform determination on the basis of whether or not connection through two-way communication between the first communication apparatus 10 and the one or more second communication apparatuses 20 exists (step Sb5).

In the case where the first communication apparatus 10 is not in a state of being connected to the one or more second communication apparatuses 20 through two-way communication in step Sb5, it is determined that the one or more second communication apparatuses 20 are in a non-use state, and the flow proceeds to step Sb13. In the case where the first communication apparatus 10 and the one or more second communication apparatuses 20 are in a state of being connected through two-way communication in step Sb5, the first control means 14 of the first communication apparatus 10 and the second control means 27 of the one or more second communication apparatuses 20 perform determination on the basis of the reception signal strength of the third wireless signal used in two-way communication between the first communication apparatus 10 and the one or more second communication apparatuses 20 (step Sb6).

In the case where the reception electric field strength of the third wireless signal is lower than the specified value in step Sb6, it is determined that the one or more second communication apparatuses 20 are in a non-use state, and the flow proceeds to step Sb13. In the case where the reception electric field strength of the third wireless signal is higher than or equal to the specified value in step Sb6, the first control means 14 of the first communication apparatus 10 stops the call function of the first transmission means 11, and the second control means 27 of the one or more second communication apparatuses 20 activate the wait functions of the one or more second reception means 21 (step Sb7). In the present embodiment, even when the call function of the first transmission means 11 is stopped, vehicle operations are possible.

Next, the first control means 14 of the first communication apparatus 10 and the second control means 27 of the one or more second communication apparatuses 20 perform determination on the basis of the number of the one or more second communication apparatuses 20 connected to the first communication apparatus 10 through two-way communication (step Sb8).

In the case where the number of the one or more second communication apparatuses 20 connected through communication is two or more in step Sb8, the second control means 27 of the one or more second communication apparatuses 20 in an unconnected state stop the wait functions of the second reception means 21 (step Sb9). Then the flow proceeds to step Sb10. In the case where the number of the one or more second communication apparatuses 20 connected through communication is less than two, the flow proceeds to step Sb10.

In step Sb10, in accordance with instructions and information from the one or more second communication apparatuses 20, ID information is transmitted and received between the first communication apparatus 10 and the one or more second communication apparatuses 20. Next, the first control means 14 of the first communication apparatus 10 verifies the ID information (step Sb11). Then, various vehicle operations are performed on the basis of the verification result of the ID information (step Sb12). After that, the flow returns to step Sb1, and the step Sb1 and subsequent steps are repeated.

In association with step Sb5 and step Sb6, in step Sb13, the first control means 14 of the first communication apparatus 10 stops the call function of the first transmission means 11, and the second control means 27 of the one or more second communication apparatuses 20 stop the wait functions of the second reception means 21. As a result, the power consumption of the first communication apparatus 10 and the one or more second communication apparatuses 20 can be suppressed, although vehicle operations cannot be performed. After that, the flow goes back to step Sb1, and step Sb1 and subsequent steps are repeated.

In the keyless entry system 101, the first communication apparatus 10 and the one or more second communication apparatuses 20 are connected through communication in accordance with the steps described above, and various vehicle operations are performed by utilizing wireless communication between the first communication apparatus 10 and the one or more second communication apparatuses 20.

Next, the advantageous effects of the present embodiment will be described. In the keyless entry system 101 of the present embodiment, the first communication apparatus 10 can be connected to the plurality of second communication apparatuses 20 through two-way communication. When the first communication apparatus 10 and at least one of the second communication apparatuses 20 are connected to each other through two-way communication using the third wireless signal, vehicle operations such as locking/unlocking of the doors 31 of the vehicle 30 and the like can be performed through activation of the in-vehicle equipment such as the door lock apparatuses 32 by utilizing the two-way communication. Hence, if the first transmission means 11 of the first communication apparatus 10 continues to transmit a call signal when the first communication apparatus 10 and at least one of the second communication apparatuses 20 are connected to each other through two-way communication, the first communication apparatus 10 will undesirably consume power. However, in the keyless entry system 101, in the case where the first communication apparatus 10 and at least one of the second communication apparatuses 20 are connected to each other through two-way communication, the first communication apparatus 10 stops the call function of the first transmission means 11. As a result, undesirable power consumption of the first communication apparatus 10 can be suppressed.

In the keyless entry system 101 of the present embodiment, although the first communication apparatus 10 can be connected to the plurality of second communication apparatuses 20 through two-way communication, the number of the second communication apparatuses 20 that can be simultaneously connected to the first communication apparatus 10 through two-way communication is limited to two or less from the viewpoint of ensuring communication speed, maintaining security, and the like. In this case, it is not permitted to perform vehicle operations such as locking/unlocking of the doors 31 of the vehicle 30 by activating the in-vehicle equipment such as the door lock apparatus 32 by using the unconnected second communication apparatus 20. Hence, if the unconnected second communication apparatus 20 activates the wait function of the second reception means 21, undesirable power is consumed by the second communication apparatus 20. However, in the keyless entry system 101, in the case where the first communication apparatus 10 is connected to two of the second communication apparatuses 20 through two-way communication, the unconnected second communication apparatus 20 stops the wait function of the second reception means 21. As a result, undesirable power consumption of the second communication apparatus 20 can be suppressed.

The embodiments of the present invention have been described above. However, the present invention is not limited to the embodiments described above, and modifications can appropriately be made within the scope of the present invention.

For example, in the first embodiment of the present invention, the first wireless signal may be a wireless signal having a frequency other than those in the LF band. Further, the second wireless signal and the third wireless signal may be wireless signals having frequencies other than those in the UHF band.

In the first embodiment of the present invention, the first two-way communication device 13 and the second two-way communication means 23 may be communication means conforming to communication standards other than the communication standards described above.

In the first embodiment of the present invention, the first communication apparatus 10 may have the electric field strength detection means 24. In this case, the reception electric field strength detected by the first communication apparatus 10 may be transmitted to the second communication apparatus 20 by utilizing two-way communication between the first communication apparatus 10 and the second communication apparatus 20. Further, each of the first communication apparatus 10 and the second communication apparatus 20 may have the electric field strength detection means 24.

In the first embodiment of the present invention, in the case where the non-use state of the second communication apparatus 20 is detected, only one of the call function of the first transmission means 11 and the wait function of the second reception means 21 may be stopped.

In the second embodiment of the present invention, the number of the second communication apparatuses 20 that can be connected to the first communication apparatus 10 through two-way communication may be four or more. When the communication speed can be ensured and the security can be maintained, the number of the second communication apparatuses 20 that can be simultaneously connected to the first communication apparatus 10 through two-way communication may be three or more.

In the second embodiment of the present invention, a configuration may be employed in which the first communication apparatus 10 and the second communication apparatus 20 respectively have position detection means such as GPS units, and transmit the position information regarding the first communication apparatus 10 and the position information regarding the second communication apparatus 20 detected by utilizing the respective position detection means to each other by utilizing two-way communication using the third wireless signal. Then it may be determined whether or not the user 40 has approached the vehicle 30 or whether or not the user 40 has moved away from the vehicle 30 by utilizing the position information regarding the first communication apparatus 10 and the position information regarding the second communication apparatus 20.

Further, in the second embodiment of the present invention, a configuration may be employed in which the second communication apparatus 20 includes position detection means such as a GPS unit and storage means for storing a position at which the user 40 left the vehicle 30 last time, and by comparing the position information of the second communication apparatus 20 detected by utilizing the position detection means and the position information stored in the storage means, it is determined whether or not the user 40 has approached the vehicle 30 or the user 40 has moved away from the vehicle 30.

Further, in the embodiments of the present invention, the second communication apparatus 20 may be a special-purpose mobile apparatus having predetermined operation switches, rather than a mobile information terminal.

Further, in the embodiments of the present invention, vehicle operations other than locking/unlocking of the doors 31 of the vehicle 30, lighting of welcome lights, or transmission of vehicle information may be performed by utilizing wireless communication between the first communication apparatus 10 and the second communication apparatus 20.

Further, in the embodiments of the present invention, the keyless entry system 1 or the keyless entry system 101 may be used for carriers other than vehicles such as ships, the doors of a house, or the like.

What is claimed is:

1. A keyless entry system comprising:
a first communication apparatus; and
a second communication apparatus,
the keyless entry system activating equipment that is a keyless entry target by utilizing wireless communication between the first communication apparatus and the second communication apparatus,
wherein the first communication apparatus includes:
a first transmitter configured to transmit a first wireless signal to the second communication apparatus;
a first receiver configured to receive a second wireless signal from the second communication apparatus; and
a first two-way communication device configured to perform two-way communication with the second communication apparatus by using a third wireless signal,
wherein the second communication apparatus includes:
a second receiver configured to receive the first wireless signal from the first communication apparatus;

a second transmitter configured to transmit the second wireless signal to the first communication apparatus; and second two-way communication device configured to perform two-way communication with the first communication apparatus by using the third wireless signal, wherein the first communication apparatus or the second communication apparatus includes:

an electric field strength detector configured to detect electric field strength of a wireless signal used in wireless communication between the first communication apparatus and the second communication apparatus, wherein:

the first transmitter includes a call function of periodically transmitting to the second communication apparatus a call signal for calling for a response by using the first wireless signal, the second receiver includes a wait function of waiting for the first wireless signal from the first communication apparatus, and the first communication apparatus stops the call function of the first transmitter or the second communication apparatus stops the wait function of the second receiver in a case where the first communication apparatus and the second communication apparatus are not connected to each other through two-way communication or in a case where the electric field strength detected by the electric field strength detector is less than a specified value, the second communication apparatus is one of a plurality of second communication apparatuses, the first communication apparatus is connectable to the plurality of second communication apparatuses through two-way communication, in a case where the first communication apparatus is connected to at least one of the plurality of second communication apparatuses through two-way communication, the first communication apparatus stops the call function of the first transmitter, and in a case where the first communication apparatus is connected to a predetermined number of the second communication apparatuses through two-way communication, and the second communication apparatus not connected to the first communication apparatus through two-way communication stops the wait function of the second receiver.

2. The keyless entry system according to claim 1, wherein the first communication apparatus is an in-vehicle apparatus mounted in a vehicle, wherein the second communication apparatus is a mobile apparatus carried by a user of the vehicle, and wherein the equipment is in-vehicle equipment mounted in the vehicle.

* * * * *